Jan. 14, 1930.　　　　C. L. HILL　　　　1,743,137
MEASURING APPARATUS
Original Filed July 30, 1927　　2 Sheets-Sheet 1
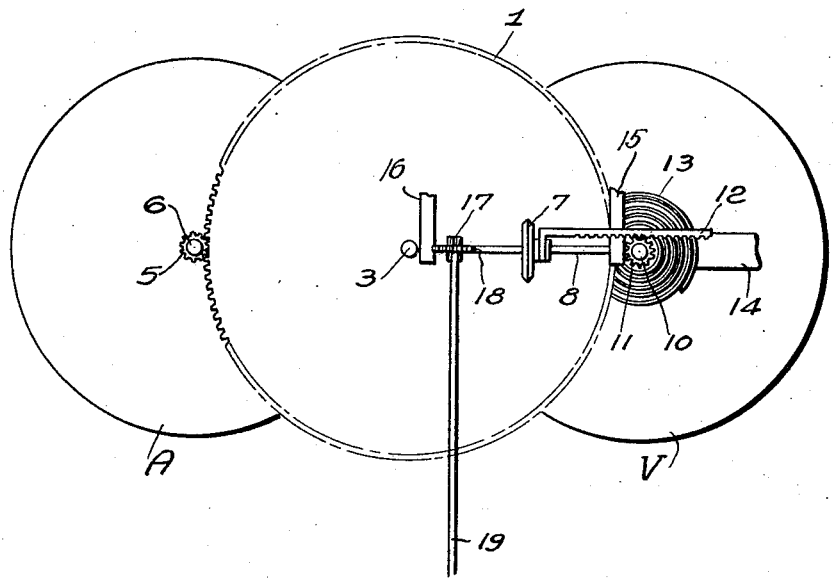
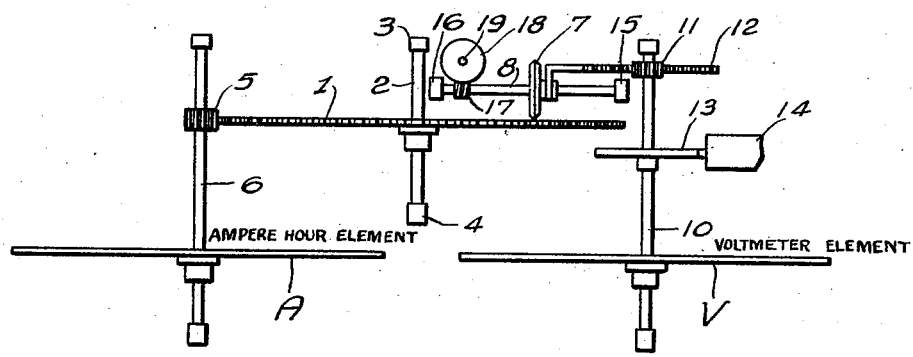
INVENTOR
*Curtiss L. Hill.*
BY
*Chesley G. Carr*
ATTORNEY Jan. 14, 1930.  C. L. HILL  1,743,137

MEASURING APPARATUS

Original Filed July 30, 1927  2 Sheets-Sheet 2

INVENTOR
Curtiss L. Hill.
BY
ATTORNEY

Patented Jan. 14, 1930

1,743,137

UNITED STATES PATENT OFFICE

CURTISS L. HILL, OF TACOMA, WASHINGTON

MEASURING APPARATUS

Application filed July 30, 1927, Serial No. 209,446. Renewed April 3, 1929.

My invention relates to measuring apparatus or instruments and has particular reference to an instrument utilizable for measuring, indicating or integrating a characteristic, as magnitude, of an electrical quantity.

In accordance with my invention, a member is actuated in accordance with changes in a characteristic of a quantity, and another member coacting directly therewith and movable with respect thereto is actuated in accordance with changes in a characteristic of another quantity contributing with said first-named quantity to the production of a third quantity.

Further in accordance with my invention, the aforesaid quantities may be electrical in character, the mechanism described producing a third electrical quantity, the magnitude of which is the product of the magnitudes of the first two quantities.

Further in accordance with my invention, one member, as aforesaid, is actuated in accordance with varying magnitudes of an electrical quantity, and another member coacting directly therewith and movable with respect thereto, is actuated in accordance with the product of an electrical quantity and a time factor.

More particularly in accordance with my invention, said one member may be actuated in accordance with varying magnitudes of the alternating electromotive force of an electrical circuit and said other member, last named, may be rotated in accordance with the product of the alternating current traversing said circuit and a time factor.

My invention resides in the apparatus, mechanism and features of construction of the character hereinafter described and claimed.

For an illustration of one of the forms my invention may take, reference is to be had to the accompanying drawings, in which Figure 1 is a schematic plan view of the component elements of apparatus constructed in accordance with my invention;

Fig. 2 is an elevational view of the apparatus of Fig. 1, and

Figure 3:
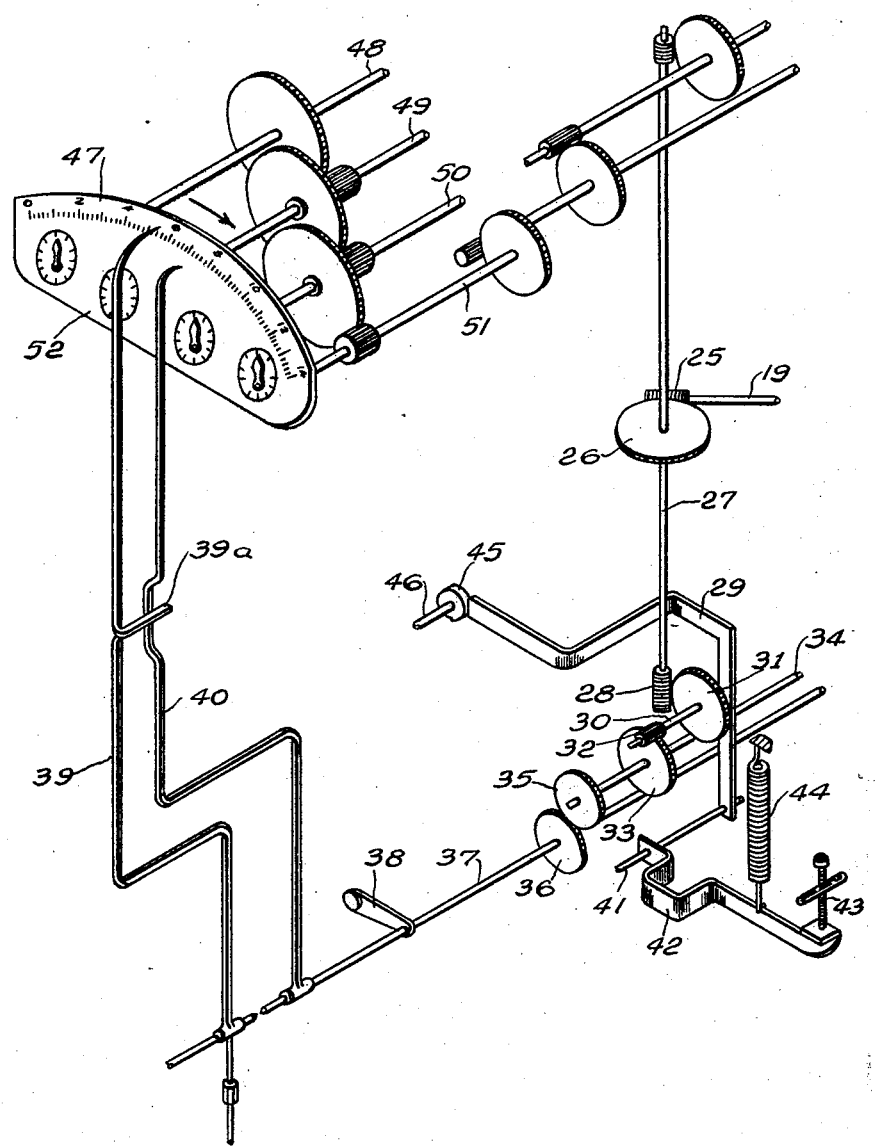
Fig. 3 is a diagrammatic view of mechanism controlled by the apparatus of Figs. 1 and 2.

Referring to the drawing, there is illustrated a rotatable or oscillatable member or disk 1 mounted on a shaft 2 disposed between jewelled, or other suitable bearings 3 and 4.

In accordance with my invention, member 1 may be actuated in any suitable manner in response to changes in a characteristic, as magnitude of a quantity. In the form of my invention herein described, said member 1 is peripherally provided with gear teeth which mesh with a gear 5 carried by a suitably journaled shaft 6 of suitable mechanism A, as an ampere-hour meter or other device rotating in accordance with the product of the current of an electrical circuit and a time factor.

Coacting directly with the aforesaid member 1 is a member or wheel 7 slidably and non-rotatably mounted on shaft 8. The position of wheel 7 with respect to, or radially of, the member 1 is controlled in response to changes in a characteristic of some quantity contributing, with the quantity actuating the member 1, to the production of a third quantity. To this end, particularly when an ampere-hour meter A is utilized, as aforesaid, wheel 7 may be moved with respect to member 1 by a device responsive to the voltage of the circuit in which the ampere-hour meter is included. Such a device is herein illustrated as an indicating voltmeter V comprising a suitably journaled shaft 10 carrying a gear 11 meshing with a rack 12 connected to the wheel 7. Shaft 10 is provided with a rotation-restraining spring or element 13 one end of which may be secured to a portion 14 of the instrument frame.

Shaft 8 is suitably journaled, as indicated at 15 and 16, to the frame of the device, and is free to rotate a gear wheel 17 secured thereto in accordance with the rotational movement of wheel 7. The worm gear 17 is suitably meshed with, to drive a gear wheel 18 that is secured to a shaft 19. The meters A and V, in the example shown, are connected to, or actuated by, the same electrical circuit. The meter A rotates continuously in accordance with the product of the ampere-hours of the circuit and therefore, member 1 is rotated at a speed proportional to the magnitude of that quantity. Simultaneously, the shaft 10 of meter V is moved to a position dependent upon the magnitude of the voltage of said circuit and the member or wheel 7, which is controlled thereby, assumes a position with respect to the member 1 which depends upon said voltage magnitude. Accordingly, shaft 19 rotates at a speed proportional to the product of the volts and ampere-hours of said electrical circuit. Since the wheel or member 7 coacts directly with the member or disk 1 and is movable with respect thereto in response to oscillatory movement of the shaft 10, it follows, upon decrease in voltage, that said member 7 approaches the center of disk 1 and the shaft 19 is rotated at decreased speed, provided the rotative speed of disk 1 does not materially change. Conversely, should the voltage increase, the wheel 7 recedes from the center of disk 1 and, under the conditions just stated, shaft 19 rotates at increased speed.

Rotative or oscillatory movement of shaft 19 may be utilized in any desired manner. By way of example, shaft 19 has been illustrated as actuating indicating or recording mechanism of the character disclosed in United States patent to Mylius, No. 1,580,523, granted April 13, 1926. When thus utilized, shaft 19 may have a gear 25 keyed thereto, Fig. 3, which meshes with and drives a gear 26 keyed to a suitably journaled shaft 27 having a worm screw 28 secured to one end thereof.

Mounted on an arm or lever 29 is a shaft 30 having secured thereto a worm wheel 31 which normally meshes with the aforesaid worm screw 28. Shaft 30 also carries a pinion 32 meshing with a gear wheel 33 mounted on a suitably journaled shaft 34, upon which a gear wheel 35 is also disposed. The latter meshes with a gear wheel 36 mounted on a suitable journaled shaft 37 having a biasing weight 38 secured thereto. Carried by the shaft 37 is a pointer or indicating member 40. A second pointer 39 comprising an actuating part 39a adapted to be engaged by pointer 40, whereby said pointer 39 is moved in a clockwise direction, Fig. 3, is provided for indicating the maximum travel of the pointer 40.

The aforesaid lever 29 is connected to a pivot pin or shaft 41 mounted in suitable bearings, not shown. Secured to the shaft 41 is an arm or member 42 biased upwardly, as viewed in Fig. 3, against an adjustable stop 43 by a spring 44, or the like.

Coacting with one end of the lever 29 is a cam 45 carried by a shaft 46 rotated at a substantially constant speed by a suitable device, not shown, but which may be of the character illustrated in the aforesaid Mylius patent.

Assuming that the pointers 39 and 40 are at the zero position of the scale 47, rotation of shaft 19, under the influence of the mechanisms A and V illustrated in Figs. 1 and 2, produces movement in the direction of the arrow, Fig. 3 of pointer 40 and resultant movement of pointer 39 through the part 39a. Such movement of the pointers continues until the raised portion of cam 45 engages the lever 29 and rocks the same on its pivot shaft 41. In so doing, worm wheel 31 is disengaged from worm screw 28 and actuation of the pointers 39 and 40 in the aforesaid direction is discontinued. At this time, both pointers indicate the integrated demand of the product of volts and ampere-hours for the period which elapsed while the pointers were moving from zero to the position just mentioned.

Immediately after worm wheel 31 was disengaged from worm screw 28, as described above, the weight 38 swung downwardly, Fig. 3, to restore pointer 40 to its zero position. After the action last described, the high point of cam 45 passes from the end of lever 29 with consequent reengagement of the worm wheel 31 with the worm screw 28, whereupon shaft 19 again functions to impart a cycle of movement to the pointer 40, the length of which is of any desired value, as fifteen minutes, more or less.

If desired, shaft 27, through the gear mechanism illustrated may be utilized for actuating the shafts 48, 49, 50 and 51 of a suitable gear train by which the indicating pointers of suitable integrating mechanism 52 are controlled.

The aforesaid pointer 39 serves to indicate the maximum demand to which the apparatus is responsive and remains in the maximum-demand-indicating position until manually reset.

It shall be understood that members 1 and 7 may be actuated otherwise than as herein described. Thus, for example, an ammeter may be substituted for the meter A in which case, when the voltmeter V is utilized, as indicated, the shaft 17 partakes of oscillatory movement only and its position is dependent upon the volt-ampere magnitude of the electrical circuit to which the ammeter and voltmeter are connected.

While I have illustrated but one embodiment of my invention, it will be apparent to those skilled in the art that various changes, modifications, substitutions, additions and omissions may be made in the apparatus illustrated without departing from the spirit and scope of my invention, as set forth in the appended claims.

I claim as my invention:

1. Metering mechanism comprising a disk, a wheel coacting directly therewith, an ampere-hour induction meter for rotating said disk, a voltmeter for moving said wheel radially of said disk, and a demand-indicating member controlled by both said wheel and said disc.

2. Metering mechanism comprising a disk, a wheel coacting directly therewith, an ampere-hour induction meter for rotating said disk, a voltmeter for moving said wheel radially of said disk, a shaft rotated by said wheel, and indicating mechanism actuated by said shaft.

3. Metering mechanism comprising a disk, a wheel coacting directly therewith, an ampere-hour induction meter for rotating said disk, a voltmeter for moving said wheel radially of said disk, a shaft rotated by said wheel, and integrating mechanism and a demand-indicating-deflecting member actuated by said shaft.

4. Volt-ampere metering mechanism comprising a rotatable member, a rotating-type meter serving exclusively to actuate said member, an element coacting directly with, and turned by, said rotatable member, an indicating-type meter for moving said element radially of said rotatable member to change its speed, and indicating mechanism actuated by said element.

5. Volt-ampere metering mechanism comprising a disk, a wheel coacting directly therewith, a rotating-type meter serving exclusively to rotate said disk, an indicating-type meter for moving said wheel radially of said disk, and indicating mechanism actuated by said wheel.

6. Metering mechanism for volt-ampere-hour measurements comprising an induction-type ampere-hour-meter element, a voltmeter element, indicating means and means jointly controlled by said elements for influencing said indicating means in accordance with the product of ampere-hours and volts.

7. Means for measuring volt-ampere-hours comprising a unitary ampere-hour meter, a voltmeter, a register means and multiplying mechanism controlled by said two meters for actuating said register means in accordance with the product of ampere hours and volts.

8. In a volt-ampere metering mechanism, the combination with a register mechanism, of an induction-type integrating meter element, an indicating-type meter element, and means jointly actuated by said meter elements for controlling said register mechanism.

9. In a volt-ampere metering mechanism, the combination with a register mechanism, of an integrating meter element, an indicating-type meter element, and means jointly actuated by said meter elements for controlling said register mechanism.

10. A volt-ampere meter comprising an integrating meter and a member driven thereby, an indicating meter element and a second member driven thereby, mechanical means for multiplying the movements of said first and second members, and indicating means controlled by said multiplying means.

In testimony whereof, I have hereunto subscribed my name this 19th day of July, 1927.

CURTISS L. HILL.